United States Patent
Toyama

(10) Patent No.: US 6,519,091 B2
(45) Date of Patent: Feb. 11, 2003

(54) IMAGING OPTICAL ELEMENT

(75) Inventor: Minoru Toyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/828,780

(22) Filed: Apr. 10, 2001

(65) Prior Publication Data

US 2001/0028509 A1 Oct. 11, 2001

(30) Foreign Application Priority Data

Apr. 11, 2000 (JP) ........................ 2000-109022

(51) Int. Cl.$^7$ ................................................ G02B 9/00
(52) U.S. Cl. ........................................ 359/654; 359/652
(58) Field of Search ................... 359/652, 654; 385/34, 119

(56) References Cited

U.S. PATENT DOCUMENTS

| | | | | |
|---|---|---|---|---|
| 3,942,866 A | | 3/1976 | Roman | 385/115 |
| 4,735,491 A | | 4/1988 | Takahashi | 359/652 |
| 5,450,157 A | * | 9/1995 | Rees | 355/1 |
| 5,457,759 A | | 10/1995 | Kalonji et al. | 385/31 |
| 5,680,492 A | | 10/1997 | Hopler et al. | 385/34 |
| 5,978,149 A | * | 11/1999 | Kittaka et al. | 359/652 |
| 6,031,668 A | * | 2/2000 | Toyama et al. | 359/654 |
| 6,078,431 A | * | 6/2000 | Kittaka et al. | 359/654 |
| 6,115,187 A | * | 9/2000 | Tabata et al. | 359/654 |
| 6,172,817 B1 | * | 1/2001 | Senapati et al. | 359/654 |

FOREIGN PATENT DOCUMENTS

EP          0 759 569          2/1997

* cited by examiner

Primary Examiner—Georgia Epps
Assistant Examiner—David N. Spector
(74) Attorney, Agent, or Firm—Whitham, Curtis & Christofferson, P.C.

(57) ABSTRACT

An imaging optical element is comprised of a gradient index rod lens 12 of which external peripheral surface is a smooth surface without being processed by means of a flare-cut treatment and a field limitation stop member 14 mounted on the lens surface at the incidence side thereof. As for the stop member, the length t thereof is: $t > 1_o \cdot D/2X$ (where, $1_o$: a lens working distance, D: a rod lens diameter, X: a radius of field of view), whereby the angle of incidence of beam θ at the center of the lens satisfies $\theta < \tan^{-1}(X/1_o)$. It is effective especially when an application thereof is made to a rod lens array comprised of a plurality of rod lenses arranged into an array.

13 Claims, 2 Drawing Sheets

FIG. 1
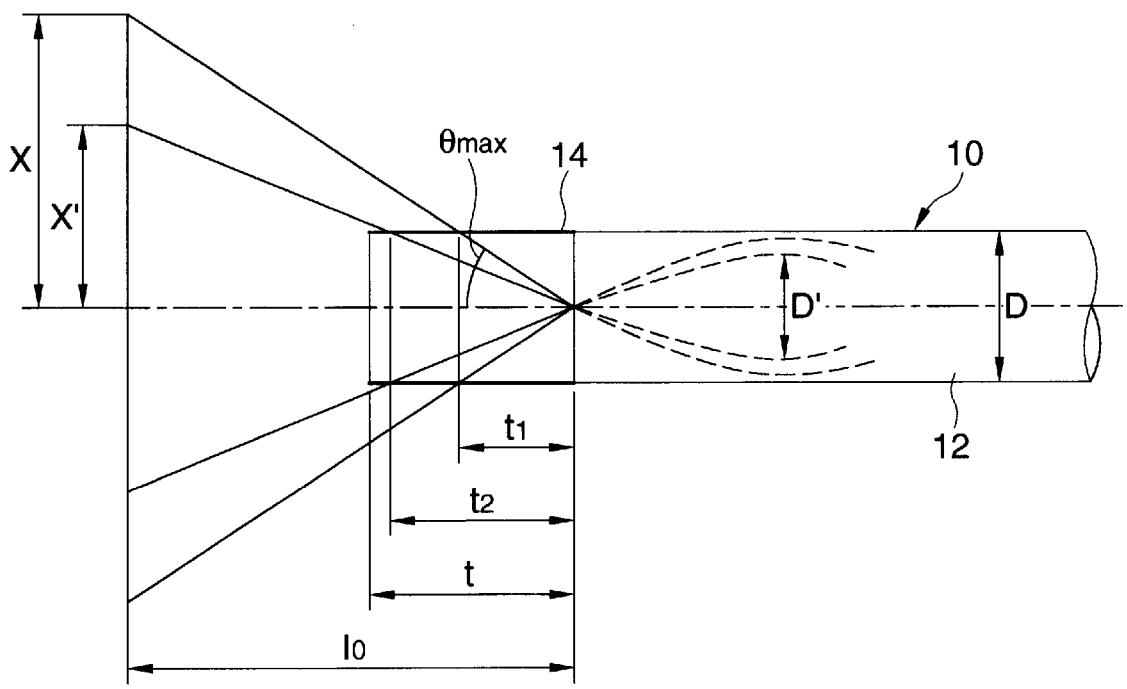
FIG. 2A  FIG. 2B  FIG. 2C
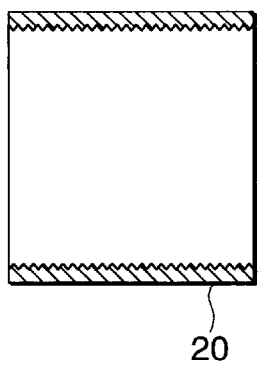
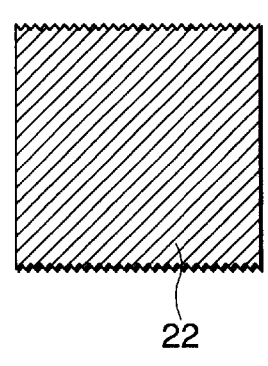
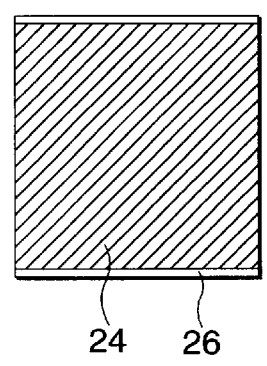

IMAGING OPTICAL ELEMENT

BACKGROUND OF THE INVENTION

The present invention relates to an imaging optical element that uses a single gradient index rod lens or a lens array in which a plurality of gradient index rod lenses are arranged in an array. More particularly, the invention is related to an optical imaging element that is adapted to eliminate flare beam by means of a field limitation stop member and that can eliminate the need for a flare-cut treatment by chemical etching on the external peripheral surface of the rod lens.

The gradient index rod lens is an optical element formed with parabolic refractive index distribution from the center toward the periphery thereof by carrying out, for example, an ion exchange treatment on a glass rod. Since optical beam propagates within the gradient index rod lens while meandering at a specific frequency, the gradient index rod lens has the function equivalent to an ordinary lens.

A rod lens of this kind may receive optical beam rays that enter into the rod lens at an angle larger than a numerical aperture of the rod lens. Since a glass rod, which is processed by means of an ion exchange treatment, has, at least in appearance, a smooth external surface as a result of the processing of fusing, spinning and then solidifying a glass, the beam rays entering at an angle larger than the numerical aperture are reflected by the external peripheral surface of the rod lens to propagate through the inside of the lens. When these beam rays are emitted from the lens, they become, what is called, flare beam. Flare beam causes a decrease in the resolution of a produced image. That is, the beam rays entering into the rod lens at an angle larger than the numerical aperture of the rod lens causes a noise on an image. Accordingly, countermeasures to prevent flare beam have been taken by carrying out a flare-cut treatment so as to form intentionally a rough surface on the external peripheral surface of the lens in order to prevent the beam rays which enter at a large angle from being reflected. In such a case, the flare-cut treatment to make a rough surface is carried out by chemical etching.

When refractive index distribution is formed within a glass rod by an ion exchange method, the refractive index distribution has a tendency to deviate from a configuration necessary for lens in the vicinity of the external periphery thereof. The above-described chemical etching is used for the purpose also of removing part of the external periphery wherein the configuration of refractive index distribution is deviated. The external peripheral surface of the glass rod after being processed by an ion exchange treatment is removed not only at a surface layer, but up to several microns in depth.

An example of an application of the gradient index rod lens is a rod lens array. The rod lens array is a beam convergent optical device that is so structured that a plurality of gradient index rod lenses are arranged parallel with each other in an array between two side plates disposed parallel with each other a distance apart and are combined into one unit by filling the clearances with black silicon resin by impregnation. The rod lens array is arranged so that a real erect image of real size is produced as a whole as a result of overlap of images produced by the neighboring lens elements. Since the rod lens array has a short optical length and does not require any inversion mirror, it has an advantage that it is possible to structure the device small in size. Consequently, the rod lens array is used in many optical scanning systems such as facsimiles and printers.

In the rod lens array described above, in order to prevent a decrease in resolution due to flare beam, gradient index rod lenses that are processes with a flare cut treatment by chemical etching on the external peripheral surface thereof are used.

As described above, in the related arts, in order to eliminate flare beam as well as to remove a portion poor in refractive index distribution, a chemical etching is carried out on the external periphery of the rod lens. However, as a consequence of the chemical etching, it is extremely difficult to reduce deviation in lens diameter. Particularly, the smaller in diameter of the rod lens, the more remarkable deviation appears in lens diameter.

In a rod lens array, due to such deviation in lens diameter, a fluctuation is caused in the lens array. As a result, unevenness in the produced image occurs.

SUMMARY OF THE INVENTION

An object of the invention is to provide an imaging optical element adapted to prevent a decrease in resolution due to flare beam without carrying out a chemical etching treatment on the external peripheral surface of the gradient index rod lens. Another object of the invention is to provide an imaging optical element in the form of a rod lens array that has little fluctuation in the array using the gradient index rod lenses uniform in lens diameter.

The invention is an imaging optical element including a gradient index rod lens and a field limitation stop member mounted on the lens surface at the incidence side thereof.

In the imaging optical element, it is preferable that the stop member is adapted so that the length t thereof is:

$$t > 1_o \cdot D/2X$$

where, $1_o$: a lens working distance, D: a diameter of the rod lens, X: a radius of field of view, and whereby the incident angle θ of beam relative to the center of the lens satisfies:

$$\theta < \tan^{-1}(X/1_o).$$

The image optical element is preferably constructed to have the gradient index rod lens of which external peripheral surface remains smooth surface without being processed by means of a flare-cut treatment.

Also, the invention is an imaging optical element that includes a rod lens array having such a structure that a plurality of gradient index rod lenses are arranged in an array and disposed between two side plates and combined into one unit by filling the clearances with a resin, and a field limitation stop member mounted on the lens surface at the incidence side thereof.

In the imaging optical element, the stop member is adapted so that the length t thereof is:

$$t > 1_o \cdot D/2X$$

where, $1_o$: a lens working distance, D: a diameter of the rod lens, X: a radius of field of view, and whereby the incident angle θ of beam relative to the center of the lens satisfies:

$$\theta < \tan^{-1}(X/1_o)$$

The imaging optical element is preferably constructed to have the gradient index rod lenses of which external peripheral surfaces remain smooth without being processed by means of a flare-cut treatment.

More preferably, the stop member is adapted so that the length t thereof is:

$$t > l_o \cdot D/2X'$$

where, X': a maximum height of object that a good image is obtained, and whereby the incidence angle θ of beam relative to the center of the lens, $$\theta < \tan^{-1}(X'/l)$$

is satisfied.

The present disclosure relates to the subject matter contained in Japanese patent application No. Hei. 2000–109022 (filed on Apr. 11, 2000), which is expressly incorporated herein by reference in its entirety.

BRIEF DESCRIPTION OF THE DRAWINGS

FIG. 1 is an illustration showing an embodiment of an imaging optical element according to the invention.

FIG. 2 is an illustration showing a concrete example of a field limitation stop member used thereon.

DESCRIPTION OF THE PREFERRED EMBODIMENT

Figure 3A:
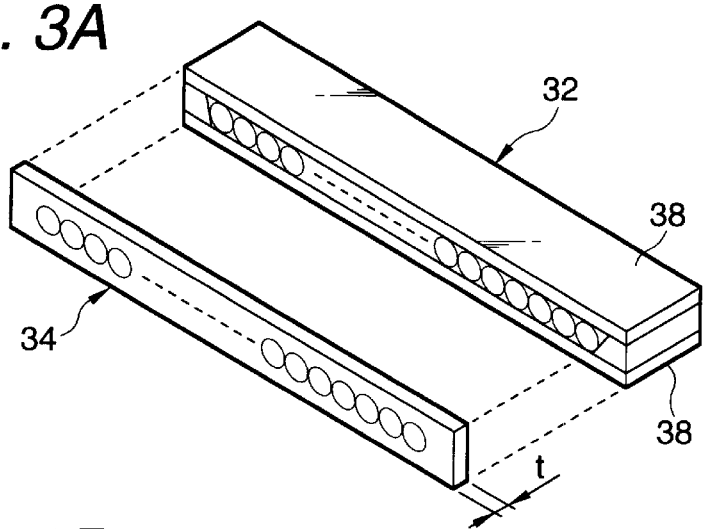
FIG. 3 is an illustration showing another embodiment of the imaging optical element according to the invention.

As for the field limitation stop member mounted on the lens surface at the incidence side of the rod lens, for example, an opaque pipe having an outside diameter substantially equal to the same of the rod lens and an internal surface processed into a rough surface is used. In another case, a cylindrical transparent body having an outside diameter substantially equal to the same of the rod lens and an external surface processed into a rough surface may be used. Or a cylindrical transparent body with a beam absorption layer comprised of a beam absorption layer, that has a refractive index larger than the same of the transparent cylinder, formed on the external peripheral surface of the transparent cylinder having an external diameter substantially equal to the same of the rod lens may be used.

As for the field limitation stop member mounted on the lens surface at the incidence side of the rod lens array, a multi-aperture block that is formed and arranged with a plurality of through-holes having an external diameter substantially equal to the same of the rod lens and an internal peripheral surface processed into a rough surface at the position corresponding to respective rod lends is used. In another case, an array of transparent bodies, in which a plurality of cylindrical transparent bodies having an external diameter substantially equal to the same of the rod lens and an external peripheral surface thereof is processed into a rough surface, arranged in an array at a pitch same as the rod lenses and combined into one unit may be used. Or an array of transparent bodies in which the cylindrical transparent bodies with a beam absorption layer, the beam absorption layer having a refractive index larger than the same of the transparent cylinders is formed on the external peripheral surface of the transparent cylinders having external diameter substantially equal to the same of the rod lenses, are arranged in an array and disposed at a same pitch as the rod lenses and combined into one unit may be used.

FIG. 1 is an illustration showing an embodiment of an imaging optical element according to the invention. The imaging optical element 10 is comprised of a gradient index rod lens 12 and a field limitation stop member 14 mounted on the lens surface at the incidence side thereof (in FIG. 1, it is defined as the left-hand side of the figure is the incidence side, whereas the right-hand side thereof is the outgoing side).

The gradient index rod lens 12 is prepared in a manner that a fused class is spun and solidified so that it has a predetermined outside diameter and the same is soaked in a molten salt to carry out ion exchange treatment to form parabolic refractive index distribution from the center toward the periphery thereof, and then, the same is cut off at a predetermined length and the end faces are polished. The gradient index rod lens 12 is different from the conventional products which are a glass rod after an ion exchange treatment is carried out. The gradient index rod lens 12 is cut off without carrying out a flare cut treatment of the external peripheral surface by chemical etching. Accordingly, at least in appearance, a smooth outside surface after ion exchange treatment is maintained.

The field limitation stop member 14 is adapted so that, the length t thereof is, $$t > l_o \cdot D/2X$$

where, $l_o$: a lens working distance; D: a diameter of the rod lens, and X: a radius of field of view, whereby the incident angle θ of beam relative to the center of the lens:

$$\theta < \tan^{-1}(X/l_o)$$

is satisfied. The field limitation stop member 14 is mounted, as described above, on the lens surface at the incidence side of the gradient index rod lens 12.

Referring to FIG. 1, a consideration will be given to beam that enters a rod lens of diameter D at the center thereof. It is assumed that an object of a maximum height X at a position $l_o$ away from the lens plain of the incidence side is to be imaged. The things depend on the properties of the lens; $l_o$ represents a lens working distance, X represents a radius of field of view. In case where the external periphery is not removed by means of an etching, the beam that passes through the outermost portion of the lens is prevented to produce a good image due to a disturbance of refractive index distribution. Herein, assuming that a height of an object that a good image can be obtained is X' (<X), an effective diameter of the lens at this time is D' (<D): X/D=X'/D'is satisfied. Herein, the lens effective diameter D' is a value smaller than the lens diameter D by several μm to several deca μm.

Flare beam is produced by the beam rays that enter at an angle of incidence θ greater than $\theta_{max}(=\tan^{-1}(X/l_o))$. Therefore, in the invention, the field limitation stop member 14 mounted on the lens surface at the incidence side thereof prevents beam having an angle of incidence greater than the above-mentioned $\theta_{max}$ from entering. As it is clear from FIG. 1, the length t of the stop member 14 in optical axis direction requires at least $t_1=l_o D/2X$. In case of $t>t_1$, as for flare beam removal, there is no problem. Further, to actually avoid using the area where the refractive index distribution of the external periphery of the lens is disturbed, it is achieved in case where $$t > t_2 = 1_o \cdot D/2X'$$

is satisfied. However, when the value of t is large, as the angle of incidence is limited to a narrow range. Accordingly, as the quantity of incident beam is decreased, it is not preferable to set the value of t too large.

FIGS. 2A, B and C show concrete examples of the field limitation stop members respectively used for the imaging optical element shown in FIG. 1.

FIG. 2A shows an example where an opaque pipe is used as a field limitation stop member. An opaque pipe 20 made of a metal or the like that has a diameter substantially equal to the same of the rod lens is cut off at a length t described above and the same is used. However, as the internal peripheral surface thereof is irradiated by flare beam, as a preventive measure against the reflection, the internal peripheral surface thereof is processed into a rough surface. Further, it is preferable that the internal peripheral surface is colored in block.

FIG. 2B shows an example where a cylindrical transparent body is used as a field limitation stop member. A uniform transparent cylinder 22 made of glass or the like that has an outside diameter substantially equal to the same of the rod lens is cut off at a length t described above and the same is used. In this case also, in order to prevent total reflection of flare beam on the external peripheral surface, the peripheral surface thereof is processed into a rough surface (a minute unevenness processing), and both end faces thereof are polished. And the stop member is joined with the lens surface at the incidence side of the gradient index rod lens using an optical adhesive or the like.

FIG. 2C shows an example with a cylindrical transparent body with a beam absorption layer as a field limitation stop member. A uniform transparent cylinder 24 made of glass or the like that has an outside diameter substantially equal to the same of the rod lens is cut off at a length t described above and is affixed to the incident end of the gradient index rod lens. In this case, in order to prevent total reflection of flare beam on the external peripheral surface of the transparent cylinder, a beam absorption layer 26 that has a refractive index greater than the same of the transparent cylinder 24 is formed thereon. Both end faces are polished and the same is joined with the gradient index rod lens using an optical adhesive or the like.

Figure 3B:
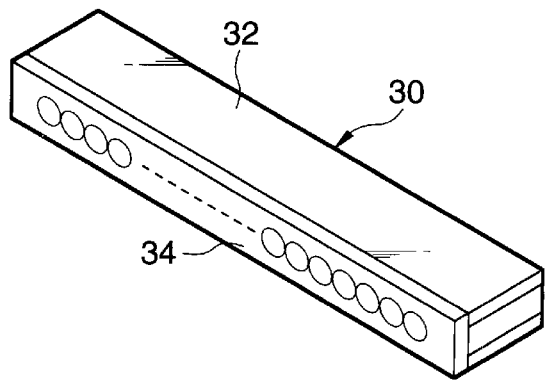

FIGS. 3A and 3B are illustrations showing another embodiment of an imaging optical element according to the invention. FIG. 3A shows a disassembled status thereof; FIG. 3B shows an assembled status thereof respectively. The imaging optical element 30 is comprised of a rod lens array 32 and a field limitation stop member 34 mounted on the lens surface at the incidence side thereof. The rod lens array 32 is so structured that a plurality of gradient index rod lenses 36, each of which has an external peripheral surface that is a smooth surface not processed by means of flare-cut treatment, that are arranged in an array and disposed between two side plates 38 and combined into one unit by filling the openings with black silicon resin. The field limitation stop member 34 is adapted so that the length t thereof is:

$$t > 1_o \cdot D/2X$$

where, $1_o$: a lens working distance, D: a rod lens diameter, X: a radius of field of view, whereby the angle of incidence θ at the center of the lens: $\theta < \tan^{-1}(X/1_o)$ is satisfied.

Influence of the flare beam appears when the rod lenses are arranged in an array as described hereinbefore. In the case of a rod lens array, it is necessary to provide a stop element for each rod lens. Therefore, as shown in FIGS. 3A and 3B, the stop elements are also formed into one unit in an array so as to have the same pitch as the rod lenses, and then, the same are combined with the lens array.

Figure 4A:
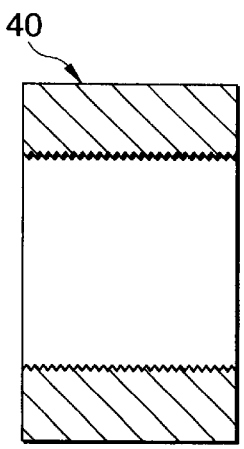
FIG. 4 is an illustration showing an example of a field limitation stop member used thereon.

FIGS. 4A, B and C shown example of a field limitation stop member used for the rod lens array. FIG. 4A shows an example of a multi-aperture block 40 made of metal or resin formed with a plurality of through-holes that have an outside diameter substantially equal to the same of the rod lenses as well as the internal peripheral surface processed into a rough surface at the position corresponding to respective rod lenses.

Figure 4B:
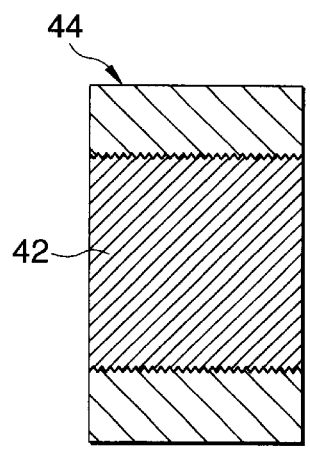
Figure 4C:
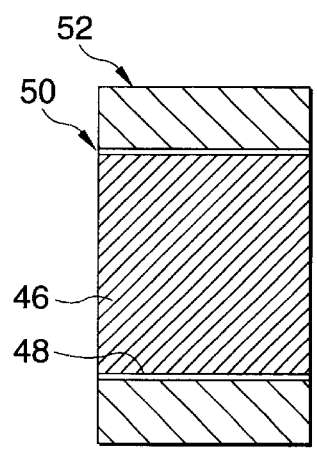

FIG. 4B shows an example of an array of transparent bodies 44 in which cylindrical transparent bodies 42 made of glass or the like having an outside diameter substantially equal to the same of the rod lenses and external peripheral surface processed into a rough surface are arranged into an array at a pitch equal to the same of the rod lenses and combined into one unit. FIG. 4C shows an array of transparent bodies 52 in which, on the peripheral surface of a transparent cylinder 46 made of glass or the like having an outside diameter substantially the same as that of the rod lens, a cylindrical transparent body 50 formed with a beam absorption layer comprised of a beam absorption layer 48 having a refractive index greater than the refractive index of the transparent cylinder 46, and then, arranged into an array at a pitch the same as the rod lenses and combined into one unit. Preparation of the array of transparent bodies shown in FIGS. 4B and C respectively may be basically the same as that of the rod lens array. That is to say, cylindrical transparent bodies are arranged in an array and sandwiched by two side plates and then combined into one unit. Then, after being cut off at a predetermined length, both end surfaces thereof are polished. The array of transparent bodies as described above and the rod lens array are aligned in place and combined into one unit.

As described hereinbefore, since the present invention is so structured that a field limitation stop member is mounted on the lens surface at the incidence side of the gradient index rod lens, it is possible to eliminate flare beam without carrying out a flare-cut treatment by chemical etching on the external peripheral surface of the rod lens, the resolution of a produced image is increased. Further, as chemical etching is not required, the manufacturing cost can be reduced as well as fluctuation in lens diameter hardly occurs. As it is made possible to provide a uniform diameter of the lenses, particularly in the case where a rod lens array is comprised of rod lenses of a small diameter arranged into an array, it is possible to prevent disturbance in the array resulting in a remarkable advantage to prevent fluctuation in a produced image.

In addition, although the arrangement of the present invention is preferably applied to a gradient index rod lens having a raw external peripheral surface that is not subjected to chemical etching, the arrangement of the present invention can also be applied to a gradient index rod lens having the rough external peripheral surface obtained as a result of chemical etching.

What is claimed is:

1. An imaging optical element comprising:

a gradient index rod lens; and a field limitation stop member mounted to an incident side lens surface of the gradient index rod lens, wherein the length t of the stop member is:

$$t > l_o D / 2X$$

where, $l_o$: a lens working distance, D: a diameter of the rod lens, X: a radius of the field of view, and whereby the incident angle $\theta$ of a beam relative to a center of the lens satisfies: $\theta < \tan^{-1}(X/l_o)$.

2. The imaging optical element according to claim 1, wherein an external peripheral surface of the gradient index rod lens remains smooth without being subjected to a flare-cut treatment.

3. The imaging optical element according to claim 1, wherein the stop member is an opaque pipe of which outside diameter is substantially equal to the outside diameter of the rod lens, and the internal surface of the opaque pipe is processed into a rough surface.

4. The imaging optical element as according to claim 1, wherein the stop member is a cylindrical transparent body of which outside diameter is substantially equal to the outside diameter of the rod lens, and the external surface of the cylindrical transparent body is processed into a rough surface.

5. The imaging optical element according to claim 1, wherein the stop member is a cylindrical transparent body on which a beam absorption layer is formed, the beam absorption layer having are fractive index larger than a refractive index of the cylindrical transparent body, and the external diameter of the cylindrical transparent body is substantially equal to the external diameter of the rod lens.

6. An imaging optical element comprising:

a gradient index rod lens; and a field limitation stop member mounted to an incident side lens surface of the gradient index rod lens, said field limitation stop member limiting an incidence angle of light into said gradient index rod lens.

7. An imaging optical element comprising:

a rod lens array unit including two side plates, a plurality of gradient index rod lenses arranged in an array and held between the side plates with resin; and a field limitation stop member mounted to an incident side lens surface of the rod lens array unit.

8. The imaging optical element according to claim 7, wherein an external peripheral surface of each of the gradient index rod lenses remains smooth without being subjected to a flare-cut treatment.

9. The imaging optical element according to claim 7, wherein a length t of the stop member is:

$$t > l_o \cdot D / 2X$$

where, $l_o$: a lens working distance, D: a diameter of the rod lens, X: a radius of field of view, and whereby the incident angle $\theta$ of beam relative to the center of the lens satisfies:

$$\theta < \tan^{-1}(X/l_o)$$

10. The imaging optical element according to claim 7, wherein the stop member is a multi-aperture block formed, at positions corresponding to the respective rod lenses, with a plurality of through-holes, each having an external diameter substantially equal to the external diameter of the respective rod lens and an internal peripheral surface processed into a rough surface.

11. The imaging optical element according to claim 7, wherein the stop member is an array of transparent bodies in which cylindrical transparent bodies having an external diameter substantially equal to the external diameter of the rod lens and an external peripheral surface processed into a rough surface are arranged in an array at the same pitch as the array of the rod lenses.

12. The imaging optical element according to claim 7, wherein the stop member is an array of transparent bodies in which cylindrical transparent bodies having an external diameter substantially equal to the external diameter of the rod lens are arranged in an array at the same pitch as the array of the rod lenses, and each of the cylindrical transparent bodies is formed at its external peripheral surface with a beam absorption layer having a refractive index larger than a refractive index of the cylindrical transparent body.

13. The imaging optical element according to claim 1, wherein a length t of the stop member is:

$$t > l_o \cdot D / 2X'$$

where, X' is a maximum height of an object from which an image is obtained, and whereby the incidence angle $\theta$ of a beam relative to the center of the lens satisfies:

$$\theta < \tan^{-1}(X'/l_o).$$

* * * * *